(12) United States Patent
Cumby et al.

(10) Patent No.: US 8,938,386 B2
(45) Date of Patent: Jan. 20, 2015

(54) CLASSIFICATION-BASED REDACTION IN NATURAL LANGUAGE TEXT

(75) Inventors: Chad Cumby, Chicago, IL (US); Rayid Ghani, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 981 days.

(21) Appl. No.: 13/048,003

(22) Filed: Mar. 15, 2011

(65) Prior Publication Data

US 2012/0239380 A1 Sep. 20, 2012

(51) Int. Cl.
G06F 17/20 (2006.01)
G06F 17/27 (2006.01)
G10L 15/18 (2013.01)
G06F 17/00 (2006.01)
G06F 17/21 (2006.01)

(52) U.S. Cl.
CPC ............ *G06F 17/2785* (2013.01); *G06F 17/21* (2013.01); *G06F 17/2765* (2013.01)
USPC .................... 704/9; 704/1; 704/231; 704/257; 715/255; 715/256; 707/687; 707/705; 707/757; 707/776; 707/780

(58) Field of Classification Search
CPC ....... G06F 19/322; G06F 17/00; G06F 17/20; G06F 17/21; G06F 17/211; G06F 17/218; G06F 17/24; G06F 17/27; G06F 17/2765; G06F 17/278; G06F 17/30; G06F 17/30023; G06F 17/30029; G06F 17/30058; G06F 17/30115; G06F 17/30386
USPC .................. 704/1, 9, 257, 231; 715/255, 256; 707/705, 757, 776, 780–783, 813; 706/12, 52
See application file for complete search history.

(56) References Cited

U.S. PATENT DOCUMENTS

| | | | | |
|---|---|---|---|---|
| 7,509,684 | B2 * | 3/2009 | McDonald et al. | 726/26 |
| 7,805,305 | B2 * | 9/2010 | Badt et al. | 704/257 |
| 7,822,768 | B2 * | 10/2010 | Maymir-Ducharme et al. | 707/776 |
| 7,876,335 | B1 * | 1/2011 | Pittenger et al. | 345/629 |
| 7,885,944 | B1 * | 2/2011 | Bruening | 707/694 |

(Continued)

OTHER PUBLICATIONS

V. T. Venkatesan, et al., Efficient Techniques for Document Sanitization, ACM Conference on Information and Knowledge Management, 2008.*

(Continued)

*Primary Examiner* — Paras D Shah
(74) *Attorney, Agent, or Firm* — Harrity & Harrity, LLP

(57) ABSTRACT

When redacting natural language text, a classifier is used to provide a sensitive concept model according to features in natural language text and in which the various classes employed are sensitive concepts reflected in the natural language text. Similarly, the classifier is used to provide an utility concepts model based on utility concepts. Based on these models, and for one or more identified sensitive concept and identified utility concept, at least one feature in the natural language text is identified that implicates the at least one identified sensitive topic more than the at least one identified utility concept. At least some of the features thus identified may be perturbed such that the modified natural language text may be provided as at least one redacted document. In this manner, features are perturbed to maximize classification error for sensitive concepts while simultaneously minimizing classification error in the utility concepts.

23 Claims, 6 Drawing Sheets

(56) References Cited

U.S. PATENT DOCUMENTS

| | | | |
|---|---|---|---|
| 7,974,994 B2* | 7/2011 | Li et al. | 707/810 |
| 8,271,483 B2* | 9/2012 | Staddon et al. | 707/730 |
| 8,566,350 B2* | 10/2013 | Chow et al. | 707/780 |
| 8,601,024 B2* | 12/2013 | Kenthapadi et al. | 707/776 |
| 8,719,233 B2* | 5/2014 | Gandhi et al. | 707/692 |
| 2003/0145017 A1* | 7/2003 | Patton et al. | 707/104.1 |
| 2004/0103147 A1* | 5/2004 | Flesher et al. | 709/204 |
| 2005/0004922 A1* | 1/2005 | Zernik | 707/100 |
| 2007/0094594 A1* | 4/2007 | Matichuk et al. | 715/530 |
| 2009/0144619 A1* | 6/2009 | Best et al. | 715/277 |
| 2010/0011000 A1* | 1/2010 | Chakra et al. | 707/9 |
| 2010/0070396 A1* | 3/2010 | Schrichte | 705/34 |
| 2010/0088305 A1* | 4/2010 | Fournier | 707/706 |
| 2010/0131551 A1* | 5/2010 | Benzaken et al. | 707/769 |
| 2010/0162402 A1 | 6/2010 | Rachlin et al. | |
| 2011/0029463 A1* | 2/2011 | Forman et al. | 706/12 |
| 2011/0107205 A1* | 5/2011 | Chow et al. | 715/255 |
| 2011/0119576 A1* | 5/2011 | Aumann | 715/255 |
| 2011/0276610 A1* | 11/2011 | Hossain et al. | 707/813 |
| 2012/0131012 A1* | 5/2012 | Taylor et al. | 707/748 |

OTHER PUBLICATIONS

Cumby, Chad. "Protecting Sensitive Topics in Text Documents with PROTEXTOR." Machine Learning and Knowledge Discovery in Databases (2009): 714-717.*

"Inference Control to Protect Senstive Information in Text Documents", Cumby & Ghani, ISI-KDD 2010, Washington DC Jul. 25, 2010.

"Efficient Techniques for Document Sanitization", Chakaravarthy, et al, Proceedings of CIKM-2008, 2008.

"Detecting Privacy Leaks using Corpus-Based Association Rules", Chow, et al., Proceedings of KDD-2008, 2008.

"Sanitization's Slippery Slope: The design and study of a text revision assistant", Chow, et al. Proceedings of SOUPS-2009, 2009.

"Adversarial Classification", Dalvi, et al., Proceedings of KDD-2004, 2004.

"Differential Privacy", Dwork, Proceedings of ICALP-2006, 2006.

"Efficient signature schemes supporting redaction, pseudonymization, and data deidentification", Haber, et al., Proceedings of ASIACCS-2008, pp. 353-362, 2008.

"Vanity fair: privacy in querylog bundles", Jones, et al., Proceedings of CIKM-2008.

"I Know what you did last summer": Query logs and user privacy, Jones, et al., Proceedings of CIKM-2007, 2007.

"I-diversity: Privacy beyond k-anonymity", Kifer & Gehrke, Proceedings of ICDE-2006, 2006.

"Improving Text Classification by Shrinkage in a hierarchy of classes", McCallum, et al., Proceedings of ICML-1998, pp. 359-367, 1998.

"Feature subset selection in Text-learning", Mladenic, proceedings of ECML-98, 1998.

"Redacting with confidence: How to safely publish sanitized reports converted from WORD to pdf" NSA-SNAC, Technical Report 1333-015R-2005, Information Assurance Directorate, National Security Agency, 2005.

"Tackling the poor assumptons of naive bayes text classifiers", Rennie, et al., Proceedings of ICML 2003, 2003.

Achieving k-anonymity privacy protection using generalization and suppression, Sweeney, International Journal on Uncertainty, Fuzziness and Knowledge-based Systems, 10, 2002.

"Privacy preserving anonymization of set valued data", Terrovitus, et al., Proceedings of VLDB Endow., 1(1), 2008.

"A comparative study of feature selection in text categorization", Yang & Pedersen, Proceedings of ICML-97, 1997.

Lang, "NewsWeeder: Learning to Filter Netnews", Proceedings of the International Machine Learning Society, 1995 (9 pages).

OntoGen, "OntoGen—semi-automatic ontology editor", 2010 (2 pages).

* cited by examiner

| Home | Insert | Page Layout | References | Mailings | Review | View | Collaborative Content Assistant |

STATEMENT OF WORK – April 1, 2008

On behalf of Alpha Consulting Company ("Alpha"), I am pleased that *National* Car Company ("*NATIONAL*") wishes to retain Alpha in connection with *NATIONAL*'s Customer *Retention* Project ("the Project"). Alpha understands that *NATIONAL* would like assistance measuring and potentially improving the effectiveness of *NATIONAL*'s customer *retention* program across *NATIONAL*'s U.S. divisions, as they relate to the *National*, *Jefferson* and *Apollo* brands.

In this engagement, twenty *vehicle* lines will be analyzed:

702

- *National* Precipice
- *National* Getaway
- *National* E-Series
- *National* Fission
- *National* *Stallion*
- *Jefferson* *Breeze*
- *Jefferson* Guide
- *Apollo* Rome
- *Apollo Seafarer*

Document Client

[National ▽]

Highlight Threshold ——714

——716

| Sensitive Name/ Numbers | Type |
|---|---|
| Brand | Person |
| Charlotte | Location |
| E Series | Person |
| Francisco | Location |
| Jefferson | Person |
| Savannah | Person |
| Winston | Person |
| Atlanta | Location |
| Boston | Location |
| Washington | Location |

( ANALYZE )

——718

| Client Identifying Terms | Importance |
|---|---|
| *National* | 3.3152 |
| *Stallion* | 3.2784 |
| *Retention* | 3.1490 |
| *Breeze* | 2.8945 |
| *Apollo* | 2.2281 |
| *Seafarer* | 1.7934 |
| *Vehicle* | 1.6742 |
| Fission | 1.5839 |
| Precipice | 1.3294 |
| Getaway | 1.1096 |

( SHARE )  ● this document    ○ selection

FIG. 7

CLASSIFICATION-BASED REDACTION IN NATURAL LANGUAGE TEXT

FIELD

The instant disclosure relates generally to redaction of natural language text and, in particular, to techniques for performing such redaction based on application of classification algorithms to natural language text.

BACKGROUND

The recent, unprecedented increase in the availability of information regarding entities (whether individual, organizations, etc.) has led to significant interest in techniques for protecting the privacy when such information when is made public and/or shared with others. Currently, many of the techniques for protecting privacy have arisen in the context of structured text, such as databases and the like. For example, U.S. patent application Ser. No. 12/338,483, co-owned by the assignee of the instant application, describes an anonymization technique that may be applied to structured data. Likewise, K-anonymity techniques are known whereby values of certain attributes in a table can be modified such that every record in the table is indistinguishable from at least k−1 other records. Further still, so-called L-diversity may be employed to ensure that sensitive data about an entity cannot be inferred through use of strong background knowledge (i.e., known facts about an entity that an attacker can use to infer further information based on redacted information) by ensuring sufficient diversity in the sensitive data.

In addition to structured text, organizations like intelligence agencies, government agencies, and large enterprises also need to redact sensitive information from un-structured and semi-structured documents (i.e., natural language text) before releasing them to other entities, particularly outside their own organizations. For example, confidentiality rules often stipulate that to release a document to external organizations (or to the public), the identity of the source as well as specific source confidential information (collectively referred to hereinafter as sensitive data or sensitive concepts) must be removed from the document. Thus a user must remove any uniquely identifying information that an attacker could use to infer the identity of the source. In such a process there is necessarily a tradeoff between redacting enough information to protect the sensitive concept, while not over-redacting to the point where the utility of the document (i.e., its usefulness for accurately conveying information regarding one or more specific concepts) has been eliminated.

Although manual document sanitization is well known in the art, it is a laborious, time-consuming process and prone to human error. To address this shortcoming, various automated redaction methods for use with natural language text based on data mining, machine learning and related techniques are known in the art. For example, k-anonymity has been applied to "unstructured" data by essentially treating natural language text data as a form of a database record. Still other techniques are known whereby desired levels of privacy are achievable. However, these techniques typically suffer from a significant loss in utility in the resulting redacted text.

Thus, it would be desirable to provide techniques that are effective for redacting natural language text while simultaneously balancing protection of sensitive information with preservation of utility of the original text.

SUMMARY

The instant disclosure describes techniques for redacting natural language text, i.e., for protecting sensitive information, while simultaneously striving to maximize utility of the text. In an embodiment, this is accomplished using a multi-class classification framework. More particularly, in one embodiment, a classifier (employing any of a number of known classification algorithms) is used to provide one or more sensitive concept models according to features in natural language text and in which the various classes employed by the classifier are sensitive concepts reflected in the natural language text. Similarly, the classifier is used to provide an utility concepts model according to the features of the natural language text and in which the various classes employed by the classifier are utility concepts reflected in the natural language document. As used herein, natural language text may comprise a corpus of text constituted by a plurality of different documents. In turn, such documents may be provided in any suitable form, from separately identifiable documents to mere snippets of text, phrases, etc. Regardless, the sensitive concepts and/or the utility concepts may be known prior to application of the classifier or such concepts could be discovered in an automated fashion to either initiate or augment the various classes to be used.

Based on the sensitive concepts model and the utility concepts model and for one or more identified sensitive concept and identified utility concept, at least one feature in the natural language text is identified that implicates the at least one identified sensitive topic more than the at least one identified utility concept thereby providing identified features. At least some of the identified features in at least a portion of the natural language text may be perturbed, which portion of the natural language text may be subsequently provided as at least one redacted document. The perturbations applied to the identified features may include suppression and/or generalization of the identified features. In this manner, the techniques described herein attempt to perturb features in the natural language text to maximize classification error for the at least one identified sensitive concept within the set of potential sensitive concepts while simultaneously minimizing any classification error in the set of parallel utility concepts, particularly the at least one identified utility concept. As used herein, classification error refers to the likelihood that an attacker will inaccurately infer any sensitive concepts in the redacted document(s).

In various embodiments, the techniques noted above may be applied in a batch mode or in a per document mode. Thus, in one embodiment, a sensitive concepts implication factor and a utility concepts implication factor are determined for the corresponding identified sensitive and utility concepts based on at least some of the features in the natural language text. For each feature thus treated, a feature score is determined based on a difference between the sensitive concepts implication factor and the utility concepts implication factor. Those features having a corresponding feature score above a threshold are then provided as the identified features as described above. In another embodiment, features within a document forming a part of the natural language text corpus are selected based on numerical optimization of a constrained objective function. The constrained object function is based on class-conditional probabilities established by the sensitive concepts model and the utility concepts model. In yet another embodiment, the constrained objective function may include a constraint that the features of the document selected to numerically optimize the function must implicate a sensitive concept for the document more than at least k−1 other sensitive concepts for the document.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

FIGS. 6 and 7 illustrate examples of a user interface for implementing redaction processing in accordance with the instant disclosure.

DETAILED DESCRIPTION OF THE PRESENT EMBODIMENTS

Figure 1:
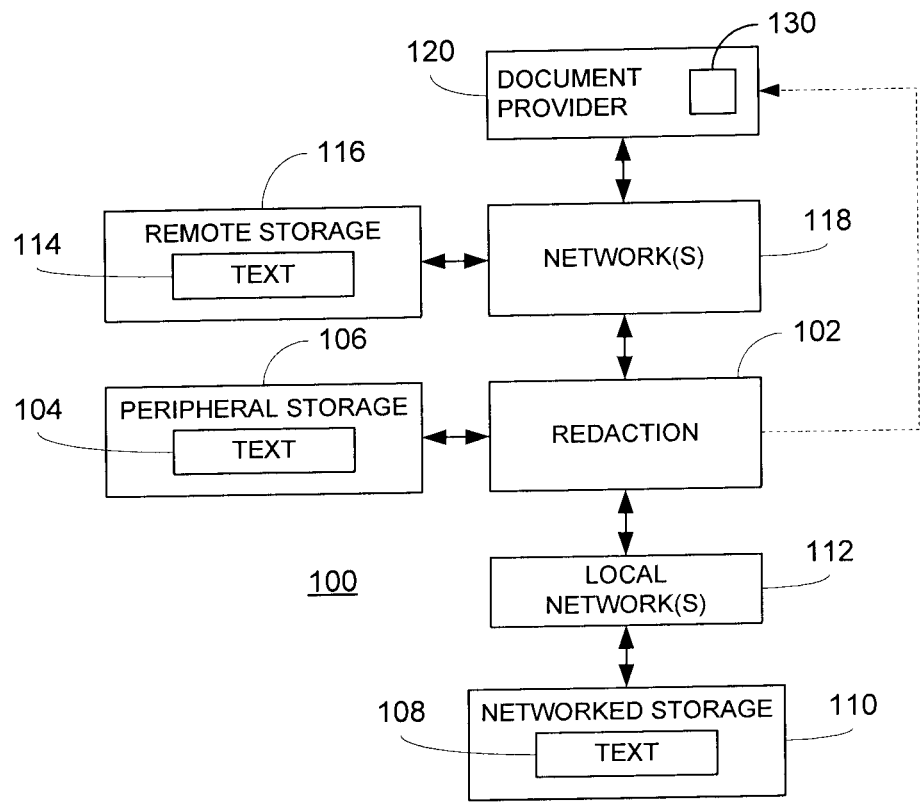
FIG. 1 is a block diagram of a system in accordance with the teachings of the instant disclosure.

Referring now to FIG. 1 a system 100 is illustrated comprising a redaction device 102 in communication with a document provider 120 via one or more intervening networks 118. As described in greater detail below, the redaction device 102 may comprise and suitable processing device such as a desktop or laptop computer, a server computer or similar devices as known in the art. Similarly, the document provider 120 may likewise comprise processing devices located at, for example, an individual's residence, a place of business, governmental organization or any other institution interested in performing redaction on a corpus of natural language text. Although a single document provider 120 is shown for ease of illustration, it is understood that multiple such third parties may exist in any implementation. The network(s) 106 may comprise a public network (e.g., the Internet, World Wide Web, etc.) or private network (e.g., local area network (LAN), etc.) or combinations thereof (e.g., a virtual private network, LAN connected to the Internet, etc.). Furthermore, the network 106 need not be a wired network only, and may comprise wireless network elements as known in the art. In one embodiment, the redaction device 102 receives the corpus of natural language text from the document provider 120 (directly or indirectly) and provides one or more redacted documents back to the document provider 120 in an electronic (typically digital) format via the network(s) 118. However, as illustrated by the dotted line, the redacting device 102 can also provide the noise perturbed data directly to the document provider 120 via other media, such as suitable storage devices including, but not limited to, magnetic or optical storage media. Furthermore, the redaction device 102 may provide any resulting redacted data, under the direction of the document provider 120, to third party recipients (not shown).

As described in greater detail below, the redaction device 102 operates upon the natural language text provided to the redaction device 102 from any of a number of sources. For example, the redaction device 102 may receive natural language text 104 to be redacted from a peripheral storage device 106 (e.g., external hard drives, optical or magnetic drives, etc.) coupled with the redaction device 102. Alternatively, the redaction device 102 may be in communication with locally networked storage 110 having stored thereon the natural language text 108 to be anonymized. Further still, the natural language text 114 may be stored in remote storage 116 that is accessible through the use of a suitable network address, as known in the art. In the latter two examples, in particular, the storage 110, 116 may be embodied as suitably configured database servers. In each of these embodiments, the text 104, 108, 114 may be received by the redaction device 102 from the document provider 130 (via the network(s) 118 or other channels) and temporarily stored in the various storage devices 106, 110, 116. In these embodiments, the entity operating the redaction device 102 may be the owner or controlling party of one or more of the various storages 106, 110, 116 or even the document provider 120 itself. Alternatively, the entity operating the redaction device 102 may be a third party providing redaction services to data owners. Regardless, as these non-exhaustive examples illustrate, the instant disclosure is not limited in the manner in which the natural language text to be analyzed is stored and/or provided to the redaction device 102.

In an alternative embodiment, the redaction, function provided by the redaction device 102 may be provided through an application interface. For example, as shown in FIG. 1, a redaction application 130 may be provided that allows a user to invoke redaction processing described in greater detail below. For example, the application 130 may comprise a text editor application, etc. as known in the art, in which the redaction functionality described herein may be invoked through activation of an appropriate user input mechanism, e.g., a button, menu selection or other widget provided via a graphical user interface or the like. Examples of suitable graphical user interfaces for this purpose are described in greater detail below with reference to FIGS. 6 and 7.

Figure 2:
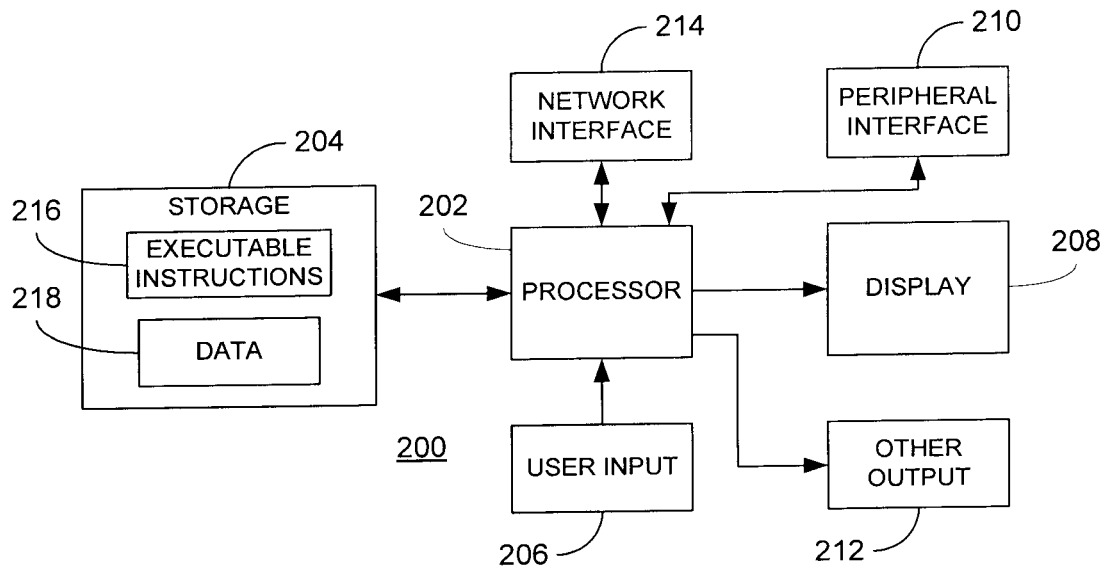
FIG. 2 is a block diagram of an apparatus the may be used to implement the various techniques described herein.

FIG. 2 illustrates an exemplary processing device 200 that may be used to implement the teachings of the instant disclosure. With reference once again to FIG. 1, the processing device 200 may be used to implement, for example, the redaction device 102. Regardless, the device 200 comprises a processor 202 coupled to a storage component 204. The storage component 204, in turn, comprises stored executable instructions 216 and data 218. In an embodiment, the processor 202 may comprise one or more processing devices such as a microprocessor, microcontroller, digital signal processor, or combinations thereof capable of executing the stored instructions 216 and operating upon the stored data 218. Likewise, the storage 204 may comprise one or more devices such as volatile or nonvolatile memory including but not limited to random access memory (RAM) or read only memory (ROM), and may be embodied in any suitable format such as a hard drive, cache memory, etc. Processor and storage arrangements of the types illustrated in FIG. 2 are well known to those having ordinary skill in the art. In an embodiment, the processing techniques described herein are implemented as a combination of executable instructions and data within the storage component 204.

In another embodiment, the device 200 may comprise one or more user input devices 206, a display 208, a peripheral interface 210, other output devices 212 and a network interface 214 in communication with the processor 202 as shown. The user input device 206 may comprise any mechanism for providing user input to the processor 202. For example, the user input device 206 may comprise a keyboard, a mouse, a touch screen, microphone and suitable voice recognition application or any other means whereby a user of the device 200 may provide input data to the processor 202. The display 208, may comprise any conventional display mechanism such as a cathode ray tube (CRT), flat panel display, or any other display mechanism known to those having ordinary skill in the art. The peripheral interface 210 may include the hardware, firmware and/or software necessary for communication with various peripheral devices, such as media drives (e.g., magnetic disk or optical disk drives, flash drives, etc.) or any other source of input used in connection with the instant techniques. Note that, as known in the art, such media drives may be used to read storage media comprising the executable instructions used to implement, in one embodiment, the various techniques described herein. Likewise, the other output device(s) 212 may optionally comprise similar media drive mechanisms as well as other devices capable of providing information to a user of the device 200, such as speakers, LEDs, tactile outputs, etc. Finally, the network interface 214 may comprise hardware, firmware and/or software that allows the processor 202 to communicate with other devices via wired or wireless networks, whether local or wide area, private or public, as known in the art.

While the device 200 has been described as a one form for implementing the techniques described herein, those having ordinary skill in the art will appreciate that other, functionally equivalent techniques may be equally employed. For example, as known in the art, some or all of the executable instruction-implemented functionality may be implemented using firmware and/or hardware devices such as application specific integrated circuits (ASICs), programmable logic arrays, state machines, etc. Further still, other implementations of the device 200 may include a greater or lesser number of components than those illustrated. Once again, those of ordinary skill in the art will appreciate the wide number of variations that may be used is this manner.

Figure 3:
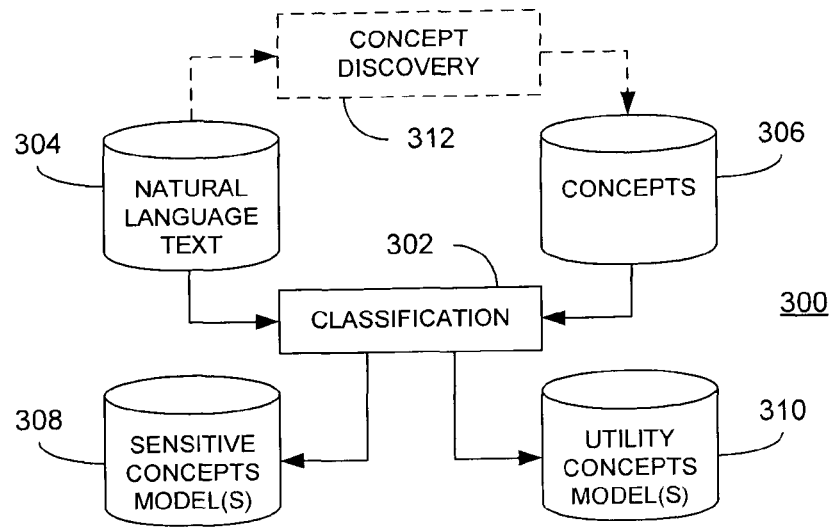
FIG. 3 is a block diagram of an apparatus for developing concept models using classification in accordance with various embodiments described herein.
Figure 5:
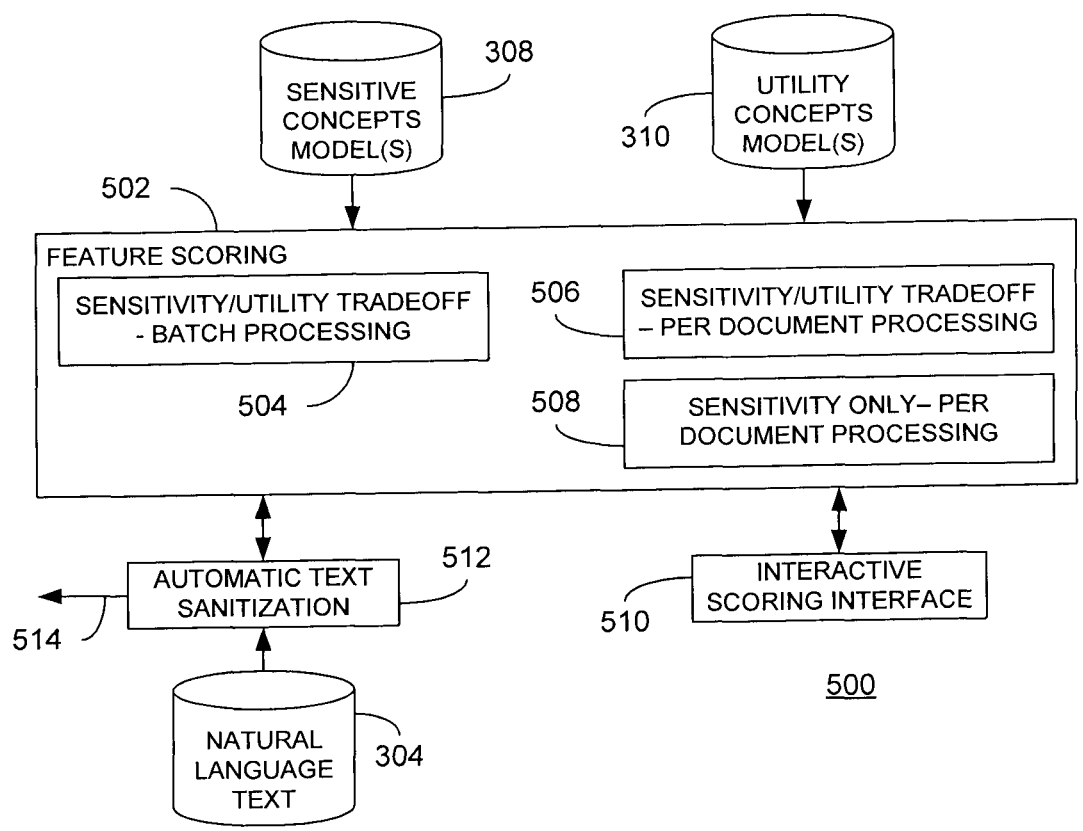
FIG. 5 is a block diagram of an apparatus for redacting natural language text in accordance with various embodiments described herein.

Referring now to FIGS. 3 and 5, apparatus 300, 500 that may be used to implement the techniques described herein are illustrated. In an embodiment, the device 200 of FIG. 2 is used to implement the various components constituting the apparatus 300, 500 in the form of stored instructions executed by one or more processors. However, as noted above, the various other functionally equivalent techniques may be equally employed for this purpose. Furthermore, as noted above, the apparatus 300, 500 may be implemented in a centralized (e.g., redaction device 102) or distributed (e.g., redaction application 130) manner. Typically, the apparatus 300, 500 are implemented in a single device, but are illustrated separately to highlight the separate types of processing done by each. More particularly, the apparatus 300, 500 implement a redaction technique based on the use of classification. Particularly, the techniques described herein treat the detection of sensitive concepts as a multi-class classification problem whereby varying levels of redaction can be employed to balance the need to protect sensitive concepts with the need to preserve utility concepts as much as possible. Furthermore, one of skill in the art will appreciate that while the functions performed by the apparatus 300 and 500 may be typically performed on a single device, these functions may also be separated over multiple devices without departing from the scope of this disclosure.

The apparatus 300 comprises a classification component 302 operatively connected to a number of storage devices 304-310. Specifically, the classification component 302 is operatively connected to and receives inputs from a natural language text storage 304 and a concepts storage 306, and is further operatively connected to and provides outputs to a sensitive concepts model(s) storage 308 and a utility concepts model(s) storage 310. Although a number of separate storage devices 304-310 are illustrated, those having ordinary skill in the art will appreciate that the various storages 304-310 could be physically implemented as one or more devices with each of the illustrated storages 304-310 existing as a logical division of the one or more, underlying storage devices. As further illustrated, the natural language text storage 304 is operatively connected to and can further provide input to a concept discovery component 312 that, in turn, is operative connected to and can provide output to the concepts storage component 306.

Before explaining the operation of the classification component 302 in greater detail, it is instructive to first describe the context of the instant disclosure with more rigor. Thus, the instant disclosure assumes the natural language text in storage 304 comprises a set D of documents. In an embodiment, each document, d, is modeled as a feature vector $\vec{x} = \langle x_1 \ldots x_n \rangle$ for finite space of n features. As used herein, features within a document may comprise individual words, phrases (or n-grams), other linguistic features, etc. depending, as known in the art, on the type of sensitive concepts to be redacted. In a further embodiment, each feature, $x_i$, may be represented in binary fashion.

Furthermore, each document d∈D is associated with a sensitive concept or category s∈S. Additionally, each document can be associated with a finite subset of non-sensitive utility concepts or categories $U_d$∈U. It is assumed that an external adversary has access to a disjoint set of documents D', each of which is associated with some s∈S and some subset of the utility categories U. As described herein, for a document d, the problem of obscuring the sensitive category s while preserving the identity of the utility categories $U_d$ is treated within a standard multi-class classification framework. It is further assumed that (d,s) pairs are generated independently and identically distributed according to some distribution $P_S$(d,s), and (d,$U_d$) pairs are generated according to $P_U$(d,$U_d$). Generally s and $U_d$ are not independent given d. The goal is to define an inference control function InfCtrl: D→D with two properties. First, InfoCtrl(d) should maximize:

$$Priv(D, InfCtrl) = \sum_{(d,s)} P_s(s \mid d) - P_s(s \mid InfCtrl(d)) \quad (1)$$

That is, the inference control function, after operating upon the various documents, should maximize the error when attempting to determine the true sensitive concepts of the documents based on analysis of the redacted documents. Second, it should minimize:

$$UtilLoss(D, InfCtrl) = \sum_{d \in D} \sum_{u \in U_d} P_U(u \mid d) - P_U(u \mid InfCtrl(d)) \quad (2)$$

That is, the inference control function, after operating upon the various documents, should minimize the error to any of the true utility concepts in the documents based on the redacted documents.

For example, assume an agency wants to release a set of documents that are about projects in specific industries for specific clients. In this example, further assume that the name of the client is sensitive, but that it would be desirable to still identify the industry of the client after redaction. In this case, the client identity is treated as the sensitive concept that needs to be obscured whereas the industry of the client becomes a utility concept to be preserved. Thus, as described in further detail below, InfCtrl needs to maximize the reduction in the conditional probability of the true sensitive concept (i.e., the client identity) given the document and minimize the reduction in the conditional probability of the true utility concept (i.e., the client industry) given the document.

As known in the art, the conditional probabilities of the various sensitive and utility concepts (or categories) can be modeled using various classifier techniques. For example, for longer documents where the sensitive concept to be redacted is a known topic, the well-known Naïve Bayes model based on word-level features is an effective classifier. However, it is understood that other classification techniques may be equally employed for this purpose. Assuming a Naïve Bayes classifier is employed, and noting that techniques for implementing Naïve Bayes classification are well known in the art, the joint distribution, $P_S(d,s)$, for a given document/sensitive concept pair (i.e., (d,s) pair) is modeled by the classification component 302 as:

$$P_S(s, d) \propto \qquad (3)$$
$$P_{nb}(s \mid x) = \frac{P_{nb}(s)P_{nb}(x \mid s)}{P_{nb}(x)} = \frac{P_{nb}(s)}{P_{nb}(s)} \prod_i^n P_{nb}(x_i \mid s)$$

where the "nb" subscript indicates Naïve Bayes modeling. Each resulting sensitive concept model (i.e., the collection of conditional probabilities noted in Equation 3) produced in this manner is then stored in the sensitive concepts model storage 308.

Likewise, the joint distribution, $P_U(d,U_d)$, for each document/utility concept pair (i.e., $(d,U_d)$ pair) is modeled by the classification component 302 in an independent fashion according to Equation 3. Once again, the resulting utility concept models produced in this manner are subsequently stored in the utility concepts models storage 310. Note that, in the cases of both the sensitive and utility concepts, the respective concepts to be used by the classification component 302 are stored in the concepts storage 306. In one embodiment, the sensitive and/or utility concepts may be added to the storage 306 by virtue of direct user input. For example, using appropriately descriptive words, a user may designate a sensitive concept (e.g., "FORD", "John Smith", identification of a specific medical procedure, etc.) and/or the one or more utility concepts (e.g., "automotive", "discretionary spending", "cancer incidence rates", etc.). Optionally, an automated approach to concept discovery may be employed for this purpose. This is illustrated in FIG. 3 by the concept discovery component 312.

Figure 4:
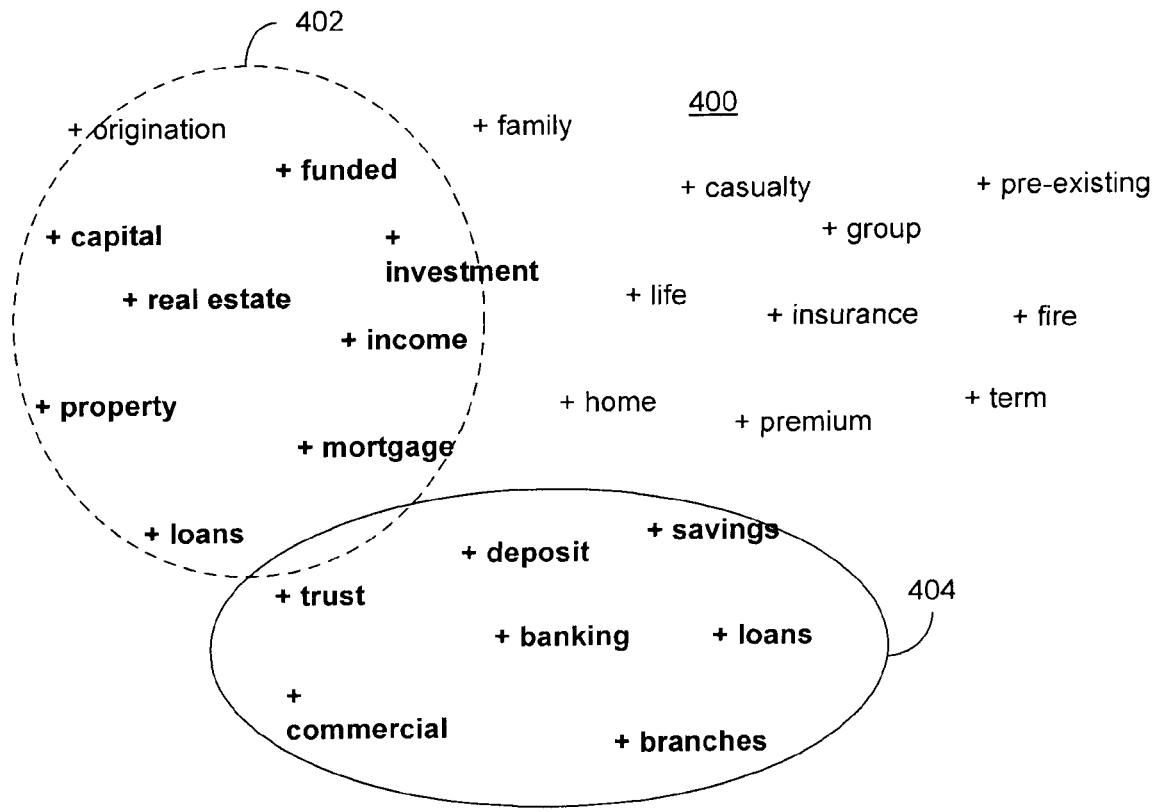
FIG. 4 illustrates an example of a user interface that may be employed for selecting concepts in accordance with the instant disclosure.

In particular, the concept discovery component 312 may implement an user interface 400 as illustrated in FIG. 4. The interface 400 may comprise a semi-automated, so-called ontology editor such as OntoGen (available at http://ontogen.ijs.si/). The OntoGen editor permits the discovery and editing of topic ontologies (i.e., a set of topics or concepts connected with each other via different types of relations) based on a corpus of documents. Using text-mining and clustering techniques, the OntoGen editor analyzes the corpus of documents (e.g., the natural language text 304) to suggest the existence of specific concepts in the documents. The OntoGen editor can display the discovered concepts as points on a two-dimensional map, e.g., the user interface 400 of FIG. 4. As shown, characteristic keywords of the discovered concepts are displayed at certain points (indicated by the "+" signs) on the map. The relative proximity of (or distance between) different points on the map corresponds to the similarity of (or dissimilarity of) the various concepts. Thus, in the illustrated example, the concept labeled "commercial" is fairly similar to "banking" but quite unlike "family." Furthermore, the OntoGen editor permits individual concepts to be selected and grouped together. In the context of the instant disclosure, selected concepts can be designated as either sensitive or utility concepts as described above. An example of this is illustrated in FIG. 4, where a first plurality of concepts 402 (in bold font) have been selected as sensitive concepts, whereas a second plurality of concepts 404 (also in bold font) have been selected as utility concepts. In an embodiment, this could be done by allowing a user to indicate either selection of sensitive or utility concepts, and then permitting the user to draw circles around concepts, as shown. Further still, individual concepts could be added to a currently selected group of concepts using, for example, the combination of clicking on a given concepts (via a cursor/mouse input device, as known in the art) while simultaneously depressing a certain keyboard key, such as the "Shift" or "Control" key. Other techniques for this purpose will be evident to those having ordinary skill in the art.

Referring now to FIG. 5, the apparatus 500 comprises a feature assessment component 502 operatively connected to an interactive scoring interface component 510 and an automatic text sanitization component 512. The feature assessment component 502 is operatively connected to the sensitive concepts models storage 308 as well as the utility concepts models storage 310. In turn, the automatic text sanitization component 512 is operatively connected to the natural language text storage 304. As described in greater detail below, the feature assessment component 502 employs various techniques to judge the various features in the natural language text 304 (based on the conditional probabilities constituting the various sensitive and utility concept models 308, 310) to determine those features that implicate the sensitive concepts more than the utility concepts. In turn, and based on the identified features provided by the feature assessment component 502, the automatic text sanitization component 512 perturbs at least some of the identified features in at least a portion of the natural language text 304, thereafter providing, as at least one redacted document 514, that portion of the natural language text in which the at least some of the identified features have been perturbed. Generally, any feature representation chosen must have corresponding operators used to perturb the identified features. In an embodiment, the two perturbation operators employed are suppression and generalization. In suppression, as known in the art, a given feature is removed or obscured entirely. For example, where each word is represented as a binary feature, certain 1-valued features are set to 0 corresponding to these words being removed from the document. On the other hand, generalization operators obscure the word by employing a more generic form. For text, a generalization operator will typically employ domain specific taxonomies of linguistic features, e.g., for words, the lexical database WordNet (available at http://wordnet.princeton.edu/) may be used to find a generalization by following the "IsA" hierarchy to find a semantic abstraction.

In an embodiment, the feature scoring component 502 may operate in at least two different modes, a batch processing mode and a per document processing mode. This is illustrated in FIG. 5, where the feature assessment component 502 includes a sensitivity/utility tradeoff batch processing component 504 and two per document processing components, a sensitivity/utility tradeoff per document processing component 504 and a sensitivity only per document processing component 508.

As its name would imply, the sensitivity/utility tradeoff batch processing component 504 operates upon a large number of documents from, if not the entirety of, the natural language text 304. The intuition is that if the features that are most informative for modeling the true joint distribution $P_S(d, s)$ and least informative for $P_U(d,U_d)$ can be identified, these are the features that must be perturbed, i.e., suppressed or generalized. In an embodiment, inference control takes place as an interactive process with a human auditor (via, for example, the interactive scoring interface 510, described below), or with automatic inference control algorithms mostly identifying the words or linguistic features to address. The batch approach refers to the process of prioritizing these features. To this end, the sensitivity/utility tradeoff batch processing component 504 may employ any of a number of scoring functions, or combinations thereof, for this purpose.

Two of the scoring function embodiments, ScoreLO and ScoreOR are respectively based on the conditional probabilities of each feature and the odds ratio thereof. For ease of explanation, here let Y be a set of classes/random variable standing in for either S or U, and $\overline{Y}=Y\backslash y$ for some $y \in Y$. Based on this notation:

$$ScoreLO(x_i) = \frac{1}{|S|}\sum_{s \in S} LogOdds(s, x_i) - \frac{1}{|U|}\sum_{u \in U} LogOdds(u, x_i) \quad (4)$$

where:

$$LogOdds(y, x_i) = \log\frac{\log(P(x_i|y))}{\log(P(x_i|\overline{Y}))} \quad (5)$$

Alternatively:

$$ScoreOR(x_i) = \frac{1}{|S|}\sum_{s \in S} OddsRatio(s, x_i) - \frac{1}{|U|}\sum_{u \in U} OddsRatio(u, x_i) \quad (6)$$

where:

$$OddsRatio(y, x_i) = \log\frac{P(x_i|y)(1 - P(x_i|\overline{Y}))}{(1 - P(x_i|y))P(x_i|\overline{Y})} \quad (7)$$

In another embodiment, a scoring function, ScoreFL, is based on a combination of feature class-conditional likelihood and feature frequency. Here freq($x_i$) is the frequency count of feature $x_i$:

$$ScoreFL(x_i) = \frac{\sum_{s \in S} FreqLogP(s, x_i)}{|S|} - \frac{\sum_{u \in U} FreqLogP(u, x_i)}{|U|} \quad (8)$$

where:

$$FreqLogP(y, x_i) = freq(x_i) \times \log\frac{P(x_i|y)}{P(x_i|\overline{Y})} \quad (9)$$

In yet another embodiment, a scoring function, ScoreIG, is based on the average information gain of a feature with respect to each sensitive category. Thus:

$$ScoreIG(x_i) = InfoGain(S, x_i) - InfoGain(U, x_i) \quad (10)$$

where:

$$InfoGain(Y, x_i) = -\sum_{y \in Y} P(y)\log P(y) + P(x_i)\sum_{y \in Y} P(y|x_i)\log P(y|x_i) + P(\overline{x}_i)\sum_{y \in Y} P(y|\overline{x}_i)\log P(y|\overline{x}_i) \quad (11)$$

It is once again noted that the conditional probabilities used in Equation 5, 7, 9 and 11 are taken from the various sensitive concept and utility concept models, as the case may be. Furthermore, each of Equations 4, 6, 8 and 10 may be characterized by a sensitive concepts implication factor (i.e., the minuend in each equation) and by a utility concepts implication factor (i.e., the subtrahend in each equation). That is, the sensitive concepts implication factor expresses how strongly a given feature, $x_i$, corresponds to the sensitive concepts in the documents, whereas the utility concepts implication factor likewise expresses how strongly the given feature corresponds to utility concepts in the documents. As the difference between the sensitive concepts implication factor and the utility concepts implication factor, higher values of the above-noted scoring functions express the condition that a given feature, if redacted, is likely to have a greater impact in obscuring the sensitive concepts and a lesser impact in obscuring the utility concepts.

Thus, for a given set of documents having associated sensitive concepts and utility concepts, any of the above-noted scoring functions (or combinations thereof) permits all the features to be ranked in descending order. For a given score threshold µ, the automatic text sanitization component 512 applies a perturbation to each feature $x_i$ with score greater than µ. For lower values of µ, more features will be sanitized and one would expect to see greater privacy with some loss of utility. Conversely, for higher values of µ, less privacy is applied to the sensitive concepts with a concomitant increase in utility concepts preservation.

While performing inference control for sensitive documents in batch mode leads to easy and efficient metrics for identifying the features that indicate sensitive concepts more and utility concepts less, for any individual document in the batch of documents thus processed, the result may be "over-redaction" or "under-redaction" due to the averaged nature of the metrics. Thus, as noted above, the feature assessment component 502 may also operate in various per documents modes whereby individual documents are subjected to sanitization or redaction processing.

For example, the sensitivity/utility tradeoff per document processing component 506 once again relies on the intuition that, for a given document, generative models (such as Naive Bayes) can be used to identify the features present in the document that imply the sensitive concepts more than the utility concepts in order to sanitize enough of them to obscure the sensitive concepts. To this end, the sensitivity/utility tradeoff per document processing component 506 can implement a linear program to numerically optimize a constrained objective function, i.e., that balances the log-likelihood of the sensitive class against the log-likelihood of the utility class using a formulation similar to log-odds:

$$\min f(\hat{x}) = -\sum_i Gain(x_i, s, U_x)\hat{x}_i \quad (12)$$

such that:

$$0 \le \hat{x}_i \le freq(x_i),$$

$$\sum_i (\log(P(x_i|s)) - 1)\hat{x}_i \le 0,$$

$$\sum_i (-\log(P(x_i|u)) - 1)\hat{x}_i \le 0,$$

where:

$$Gain(x_i, s, U_x) = \log(P(x_i|s)) - \mu \cdot \log\left(\sum_{u \in U_x} P(x_i|u)\right)$$

and where: $U_x$ is a set constituting at least one utility concept of the document and µ is a weighting parameter. It is noted that the phrases "numerical optimization," "numerically optimize" and variants thereof, as used herein, refer to the well-known function of linear programming to determine numerical values for the variables that best satisfy the stated objective function. Furthermore, techniques for implementing such linear programming are well know to those having ordinary skill in the art.

Referring once again to Equation 12 above, μ is a weighting parameter controlling how much to penalize distortion of the document that will obscure the utility classes. In general a lower value of μ will lead to much greater distortion of the document, with larger loss in utility as measured by P(u)P(x|u). Although the above-described example is based on a log-odds formulation, it will be appreciated that the other scoring formations noted above may also serve as the basis for the objective function. For example, ScoreOR can be modified to produce:

$$\text{Gain}_{OR}(x_i, s, U_x) = \text{OddsRatio}(s, x_i) - \mu \sum_{u \in U_x} \text{OddsRatio}(u, x_i)$$

As a variation on the linear programming implementation noted above, an additional constraint that can be placed on the process is to require that the Naïve Bayes likelihood from Equation 3 of the true sensitive concept for a sanitized document, InfCtrl(d), be less than the likelihood of k other categories. For this purpose, k-confusability can be defined as: for a learned multiclass classifier H outputting a total ordering $\pi = y_1 \succ \ldots \succ y_n$ over n classes for a given document d having feature vector $\vec{x} = \langle x_1 \ldots x_n \rangle$ with true class y, a new example $\hat{d}$ is said to be k-confusable with d if $H(\hat{d})$ outputs an ordering $\hat{\pi}$ with at least k classes preceding y.

With this additional constraint, a linear program can be provided to create a k-confusable example $\hat{x} = \text{InfCtrl}(x)$ that is still recognizable as belonging to the utility class u. To simplify this embodiment, only a single utility class upper example x is considered. Here, let $\bar{s} = \bar{s}_i, \ldots, \bar{s}_{k-1} \in S$ be a sequence of k−1 sensitive concepts obtained by ranking all $\bar{s} \in S \setminus s$ by $P(\bar{s})P(x|\bar{s})$. In this case, the linear program implemented by the sensitivity/utility tradeoff per document processing component 506 operates as follows:

$$\min f(\hat{x}) = -\sum_i \text{Utility}(x_i, u) \hat{x}_i \quad (13)$$

such that:

$$0 \leq \hat{x}_i \leq \text{freq}(x_i),$$

$$\sum_i (\log(P(x_i|s))\hat{x}_i) \leq \sum_i \log(P(x_i|\bar{s}_1))\hat{x}_i,$$

$$\vdots$$

$$\sum_i (\log(P(x_i|s))\hat{x}_i) \leq \sum_i \log(P(x_i|\bar{s}_{k-1}))\hat{x}_i$$

where:

$$\text{Utility}(x_i, u) = (1 - P(u))\log(P(x_i|u)) - \sum_{\bar{u} \in U \setminus u} P(\bar{u})P(x_i|\bar{u})$$

In this procedure, the objective is to maximize a "one-versus-all" version of the Naïve Bayes decision criterion for the true utility class u with respect to the rest of the utility classes $\bar{u} = U \setminus u$. The feature class-conditional likelihood of the true sensitive class is re-weighted to be equal to the sum of the prior weights from the "complement" classes. In this manner, the constraints on the linear program ensure that if a feasible solution exists, k-confusability for the model classifier is guaranteed.

In yet another embodiment, the sensitivity-only per document processing component 508 operates to provide k-confusability for some set of examples, without a corresponding set of utility categories. In this case, the amount of redaction is minimized while maintaining the constraints by substituting the objective function with Utility($x_i$)=1. This procedure can be approximated by a simple greedy algorithm: for a document example x of class s, create an ordered list of features to suppress using the metric: $(1-P(S))\log(P(x_i|s)) - \Sigma_{\bar{s}_j} P(\bar{s}_j) \log(P(x_i|\bar{s}_j))$. From this list, words from x are suppressed until the conditional log-likelihood of $s|\hat{x}$ is less than the log-likelihood of k−1 other classes.

Figure 6:
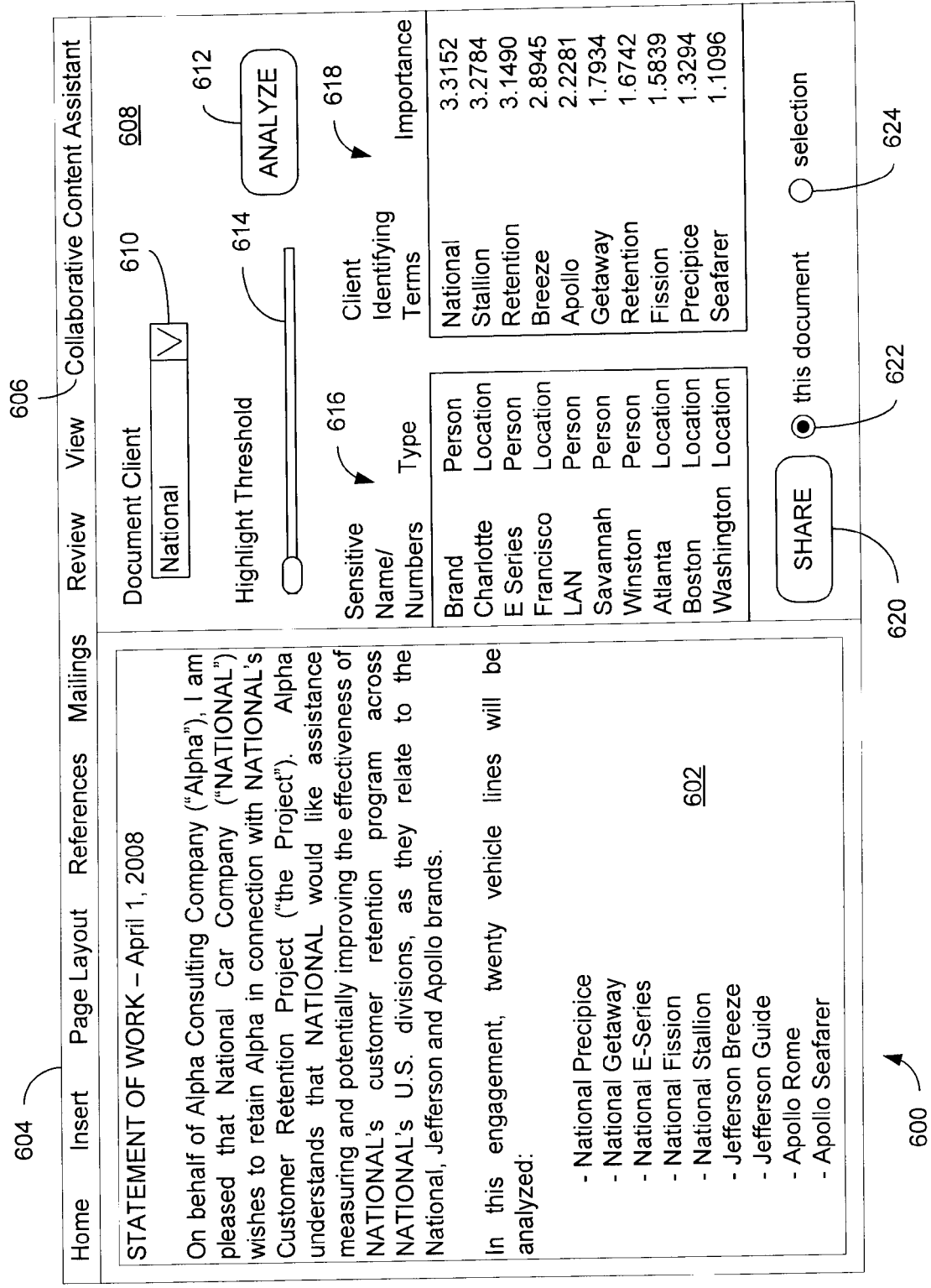

As noted above, some of the embodiments implemented by the feature assessment component 502 may be mediated according to user input received via the interactive scoring interface 510. Examples of this are illustrated in FIGS. 6 and 7. In particular, FIG. 6 illustrates an example of a user interface 600 in which a document editing program is augmented include a document redaction client. For example, as known in the art, the editing program may comprise the "MICROSOFT" Word document editing program in which a document editing field 602 is provide along with menu items 604 for use in editing/managing a given document. In the illustrated example, a "Statement of Work" document is currently open in the editing field 602, thereby permitting the author to edit or otherwise manage the document using known techniques. In this implementation, however, the menu items are modified to include a "Collaborative Content Assistant" menu item 606, the selection of which causes a sanitization control window 608 to be provided on the user interface 600. Techniques for adding the functionality of the menu item 606 and window 608 are well known in the art, typically through the creation of one or more software-based "add-on" or "plug-in" programs that interact with the document editing program via an application user interface (API) provided by the document editing program. Note that, in this example, Using the sanitization control window 608, in this case, a user is able to invoke various ones of the per document analyses noted above with reference to the feature assessment component 502. For example, using an input mechanism such as a pull-down menu 610, the user is able to designate a specific sensitive topic, in this case, constrained to an available list of known client names. Alternatively, in this example, the client names (as the sensitive topic) could be derived directly from the document (or documents), as noted above. As further shown, a user-selectable slider 614 is provided which sets a threshold (i.e., the μ variable noted above) that determines what level of features should be highlighted on the display 602 based on the redaction analysis. Upon selection of another suitable input mechanism 612 (in this case, a button labeled "Analyze"), the sanitization program performs the any of the above-noted per document analyses to provide a list of scored features 618. In this case, it is noted that the slider input 614 is set such that none of the identified features are highlighted, indicating that redaction on the basis of this setting would result in no redaction of sensitive concepts with, obviously, maximized preservation of utility. When the user decides to sanitize a document according the current settings, he/she can select the "Share" button 620 after first designating via the radio button inputs 622, 624 whether the entire document is to be redacted or just a given selected portion of the document.

As shown, the identified features 618 (in this case, referred to as "Client Identifying Terms" reflecting the fact that the sole sensitive concept in this embodiment is a client identity) are listed along with their respective scores thereby providing the user with an indication of the relative "strength" with which a given term implicates the sensitive topic (client identity, in this case) while simultaneously not implicating the utility of the document. Thus, for example, the term "National" in the illustrated example best serves this purpose, whereas redaction of the term "Seafarer" would provide a relatively lesser amount of sensitive concept protection while impacting the utility of the document to a greater degree.

As further shown in FIG. 6, the window 608 may also include a listing 616 of any names/numbers included in the document. Techniques for discovering such names and numbers in a document are well known in the art. Once again, such names and numbers may be provided in a ranked order in accordance with known techniques.

FIG. 7 illustrates an interface 700 that is substantially similar to that shown in FIG. 6. However, in this case, the slider input 714 is set such that, relative to the initial setting in FIG. 6, the number of terms highlighted is increased. Such highlighting is illustrated by the use of boldfaced font for those terms appearing in the client identifying terms list 718 and by underlined font for those terms appearing in the names/numbers list 716. In turn, the highlighting of the selected terms is also reflected in the open document 702, thereby providing the user with an indication of the impact that redaction (according to those settings) will have on the document. By varying the slider 714, the user can effectively select the level of redaction that will take place according to the need.

Figure 8:
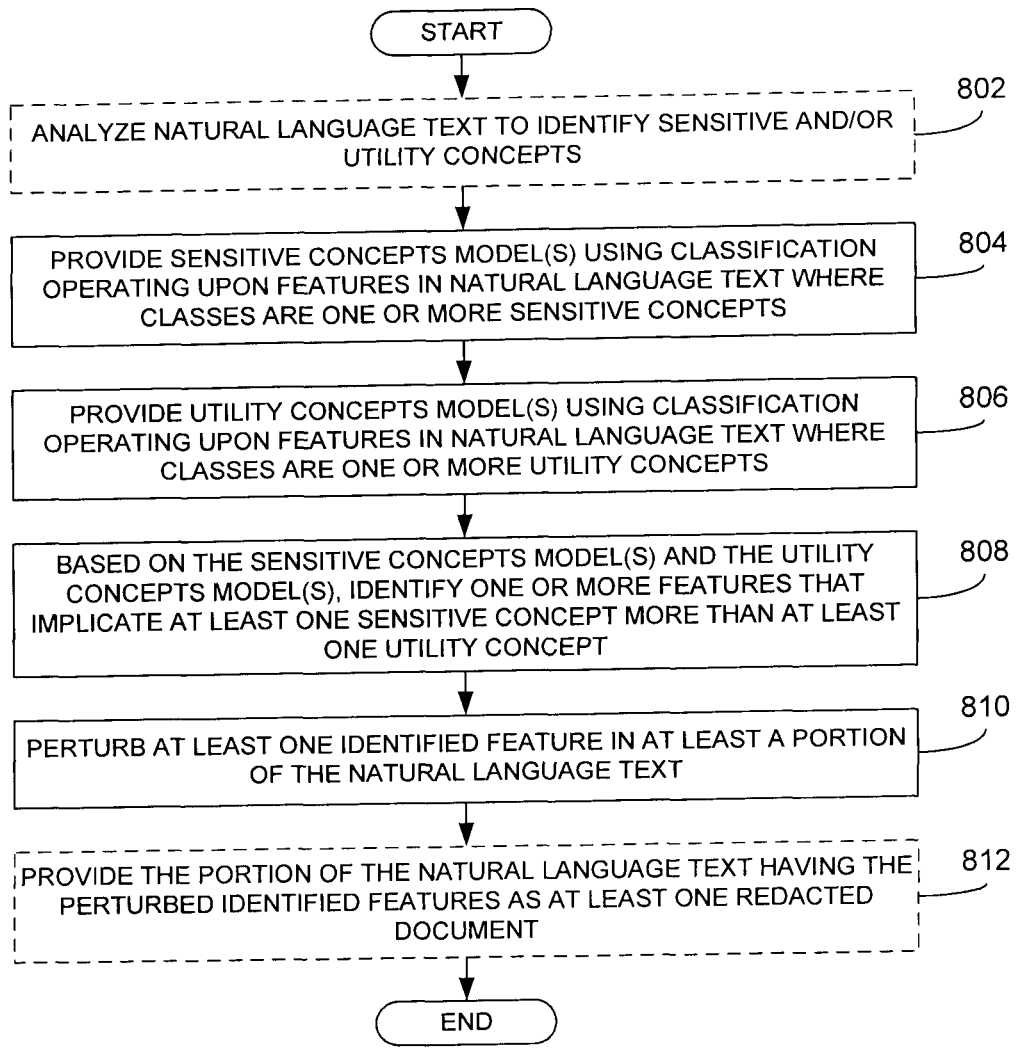
FIG. 8 is a flow chart illustrating processing in accordance with the instant disclosure.

Referring now to FIG. 8, a flowchart illustrating processing in accordance with the instant disclosure is illustrated. In an embodiment, the processing illustrated in FIG. 8 may be implemented using the apparatus 300, 500 described above. Regardless, beginning at block 802, natural language text may be optionally analyzed automatically to identify sensitive and/or utility concepts therein. As noted above, the relevant concepts may be provided directly via user input. Regardless, processing continues at block 804 where sensitive concept models (one for each sensitive concept) are provided according to a classification algorithm operating upon the features in the natural language text, wherein the classes or categories used by the classification algorithm are the previously identified sensitive concepts. Likewise, at block 806, utility concept models (one for each utility concept) are provided according to the classification algorithm operating upon the features in the natural language text, wherein the classes or categories used by the classification algorithm are the previously identified utility concepts.

Thereafter, at block 808, the sensitive concepts model(s) and the utility concepts model(s) are used to identify one or more features in the natural language text that implicate the at least one sensitive concept more than the at least one utility concept. As described above, this process of identifying such features can proceed according to various modes, i.e., batch or per document processing. Using the features thus identified, at least one identified feature is perturbed in at least a portion of the natural language text at block 810, such that the portion of the natural language text may be provided as at least one redacted document at block 812.

While particular embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method for redacting natural language text, the method comprising:
receiving, by a processing device and via a user input device operatively connected to the processing device, one or more user inputs indicating sensitive concepts and utility concepts based on a user interface that includes a visual representation of a plurality of concepts in the natural language text,
the plurality of concepts including the sensitive concepts and the utility concepts, and
the natural language text being in an electronic format;
determining, by the processing device, the sensitive concepts based on the one or more user inputs;
determining, by the processing device, the utility concepts based on the one or more user inputs;
determining, by the processing device and for at least one feature in the natural language text, a sensitive concepts implication factor based on class-conditional probabilities of the at least one feature according to the sensitive concepts;
determining, by the processing device and for the at least one feature, a utility concepts implication factor based on class-conditional probabilities of the at least one feature according to the utility concepts;
determining, by the processing device and for the at least one feature, a feature score based on a difference between the sensitive concepts implication factor and the utility concepts implication factor;
identifying, by the processing device and to obtain identified features, the at least one feature based on the feature score satisfying a threshold,
the at least one feature implicating at least one identified sensitive concept, of the sensitive concepts, more than at least one identified utility concept of the utility concepts; and
perturbing, by the processing device, at least some of the identified features in at least a portion of the natural language text.

2. The method of claim 1, further comprising:
providing, by the processing device and via a display operatively connected to the processing device, the user interface.

3. The method of claim 1, wherein the feature score is determined according to at least one mathematical function, where the at least one mathematical function is at least one of: ScoreLO($x_i$), ScoreOR($x_i$), ScoreFL($x_i$), or ScoreIG($x_i$), where:

$$ScoreLO(x_i) = \frac{1}{|S|}\sum_{s \in S} LogOdds(s, x_i) - \frac{1}{|U|}\sum_{u \in U} LogOdds(u, x_i),$$

$$\frac{1}{|S|}\sum_{s \in S} LogOdds(s, x_i)$$

corresponding to the sensitive concepts implication factor, $$\frac{1}{|U|}\sum_{u \in U} LogOdds(u, x_i)$$

corresponding to the utility concepts implication factor, and $$LogOdds(y, x_i) = \log\frac{\log(P(x_i|y))}{\log(P(x_i|\overline{Y}))},$$

$$ScoreOR(x_i) = \frac{1}{|S|}\sum_{s \in S} OddsRatio(s, x_i) - \frac{1}{|U|}\sum_{u \in U} OddsRatio(u, x_i),$$

$$\frac{1}{|S|}\sum_{s \in S} OddsRatio(s, x_i)$$

corresponding to the sensitive concepts implication factor, $$\frac{1}{|U|}\sum_{u \in U} OddsRatio(u, x_i)$$

corresponding to the utility concepts implication factor, and $$OddsRatio(y, x_i) = \log\frac{P(x_i|y)(1 - P(x_i|\overline{Y}))}{(1 - P(x_i|y))P(x_i|\overline{Y})},$$

$$ScoreFL(x_i) = \frac{\sum_{s \in S} FreqLogP(s, x_i)}{|S|} - \frac{\sum_{u \in U} FrqLogP(u, x_i)}{|U|} \frac{\sum_{s \in S} FreqLogP(s, x_i)}{|S|}$$

corresponding to the sensitive concepts implication factor $$\frac{\sum_{u \in U} FreqLogP(u, x_i)}{|U|}$$

corresponding to the utility concepts implication factor, and $$FreqLog(y, x_i) = freq(x_i) \times \log\frac{P(x_i|y)}{P(x_i|\overline{Y})},$$

$$ScoreIG(x_i) = InfoGain(S, x_i) - InfoGain(U, x_i), InfoGain(S, x_i)$$

corresponding to the sensitive concepts implication factor, InfoGain(U, $x_i$) corresponding to the utility concepts implication factor, and $$InfoGain(Y, x_i) = -\sum_{y \in Y} P(y)\log P(y) +$$

$$P(x_i)\sum_{y \in Y} P(y \mid x_i)\log P(y \mid x_i) + P(\overline{x}_i)\sum_{y \in Y} P(y \mid \overline{x}_i)\log P(y \mid x_i),\text{ and}$$

where:
$x_i$ is an i'th feature of the natural language text,
S is a set constituting the at least one sensitive concept,
s is a sensitive concept,
U is a set constituting the at least one utility concept,
u is a utility concept,
Y is a dummy variable standing in for either S or U, and
$\overline{Y}$=Y\y for some y∈Y.

4. The method of claim 1, wherein identifying the at least one feature comprises:

determining, by the processing device and for a document forming a part of the natural language text, selected features of the document that numerically optimize a constrained objective function established to ensure that the selected features of the document implicate at least one identified sensitive concept for the document more than at least one utility identified concept for the document; and providing, by the processing device, the selected features as the identified features.

5. The method of claim 4,
where the constrained objective function is:

$$\min f(\hat{x}) = -\sum_i \text{Gain}(x_i, s, U_x)\hat{x}_i$$

such that:

$$0 \leq \hat{x}_i \leq freq(x_i),$$

$$\sum_i (\log(P(x_i \mid s)) - 1)\hat{x}_i \leq 0,$$

$$\sum_i (-\log(P(x_i \mid u)) - 1)\hat{x}_i \leq 0,$$

where:

$$\text{Gain}(x_i, s, U_x) = \log(P(x_i \mid s)) - \mu \cdot \log\left(\sum_{u \in U_x} P(x_i \mid u)\right),$$

and
where:
$x_i$ is an i'th feature of the document,
s is a sensitive concept of the document,
$U_x$ is a set constituting at least one utility concept of the document,
u is a utility concept of the document, and
μ is a weighting parameter.

6. The method of claim 1, further comprising:
determining, by the processing device and for a document forming a part of the natural language text, selected features of the document that numerically optimize a constrained objective function established to ensure that the selected features of the document implicate a sensitive concept, of the sensitive concepts, for the document more than at least k–1 other sensitive concepts, of the sensitive concepts, for the document,
the constrained objective function being based on class-conditional probabilities of the selected features according to the at least one utility concept; and
providing, by the processing device, the selected features as part of the identified features.

7. The method of claim 6,
where the constrained objective function is:

$$\min f(\hat{x}) = -\sum_i \text{Utility}(x_i, u)\hat{x}_i$$

such that:

$$0 \leq \hat{x}_i \leq freq(x_i),$$

$$\sum_i (\log(P(x_i \mid s))\hat{x}_i) \leq \sum_i \log(P(x_i \mid \bar{s}_1))\hat{x}_i,$$

$$\vdots$$

$$\sum_i (\log(P(x_i \mid s))\hat{x}_i) \leq \sum_i \log(P(x_i \mid \bar{s}_{k-1}))\hat{x}_i$$

-continued where:

$$\text{Utility}(x_i, u) = (1 - P(u))\log(P(x_i \mid u)) - \sum_{\overline{u} \in U \setminus u} P(\overline{u})P(x_i \mid \overline{u}),$$

and
where:
  $x_i$ is an i'th feature of the document,
  s is a sensitive concept of the document,
  U is a set constituting at least one utility concept of the document,
  u is a utility concept of the document, and
  $\overline{s} = \overline{s}_1, \ldots, \overline{s}_{k-1} \in S$ are a sequence of k−1 sensitive concepts obtained by ranking all $\overline{s} \in S \setminus s$ by $P(\overline{s})P(x|\overline{s})$.

8. The method of claim 1, where perturbing the at least some of the identified features comprises:
  suppressing the at least some of the identified features.

9. The method of claim 1, where perturbing the at least some of the identified features comprises:
  generalizing the at least some of the identified features.

10. The method of claim 1, further comprising:
  providing, by the processing device, the portion of the natural language text in which the at least some of the identified features have been perturbed as at least one redacted document.

11. An apparatus for redacting natural language text comprising a plurality of features comprising:
  a storage;
  a processor to:
    receive, via a user input device operatively connected to the processor, one or more user inputs indicating sensitive concepts and utility concepts based on a user interface that includes a visual representation of a plurality of concepts in natural language text,
      the plurality of concepts including the sensitive concepts and the utility concepts, and
      the natural language text being in an electronic format;
    determine the sensitive concepts based on the one or more user inputs;
    determine the utility concepts based on the one or more user inputs;
    determine, for at least one feature in the natural language text, a sensitive concepts implication factor based on class-conditional probabilities of the at least one feature according to the sensitive concepts;
    determine, for the at least one feature in the natural language text, a utility concepts implication factor based on class-conditional probabilities of the at least one feature according to the utility concepts;
    determine, for the at least one feature in the natural language text, a feature score based on a difference between the sensitive concepts implication factor and the utility concepts implication factor;
    identify features of the natural language text based on the feature score satisfying a threshold,
      the identified features including the at least one feature, and
      the at least one feature implicating at least one identified sensitive concept, of the sensitive concepts, more than at least one utility concept of the utility concepts; and
    perturb at least some of the identified features in at least a portion of the natural language text.

12. The apparatus of claim 11, where the processor is further to:
  provide, via a display operatively connected to the processor, the user interface.

13. The apparatus of claim 11, where the feature score is determined according to at least one mathematical function, where the at least one mathematical function is at least one of: $\text{ScoreLO}(x_i)$, $\text{ScoreOR}(x_i)$, $\text{ScoreFL}(x_i)$, or $\text{ScoreIG}(x_i)$, where:

$$\text{ScoreLO}(x_i) = \frac{1}{|S|}\sum_{s \in S} \text{LogOdds}(s, x_i) - \frac{1}{|U|}\sum_{u \in U} \text{LogOdds}(u, x_i),$$

$$\text{LogOdds}(y, x_i) = \log\frac{\log(P(x_i \mid y))}{\log(P(x_i \mid \overline{Y}))},$$

$$\text{ScoreOR}(x_i) = \frac{1}{|S|}\sum_{s \in S} \text{OddsRatio}(s, x_i) - \frac{1}{|U|}\sum_{u \in U} \text{OddsRatio}(u, x_i),$$

$$\text{OddsRatio}(y, x_i) = \log\frac{P(x_i \mid y)(1 - P(x_i \mid \overline{Y}))}{(1 - P(x_i \mid y))P(x_i \mid \overline{Y})},$$

$$\text{ScoreFL}(x_i) = \frac{\sum_{s \in S} \text{FreqLogP}(s, x_i)}{|S|} - \frac{\sum_{u \in U} \text{FreqLogP}(u, x_i)}{|U|},$$

$$\text{FreqLogP}(y, x_i) = \text{freq}(x_i) \times \log\frac{P(x_i \mid y)}{P(x_i \mid \overline{Y})},$$

$$\text{ScoreIG}(x_i) = \text{InfoGain}(S, x_i) - \text{InfoGain}(U, x_i), \text{ and}$$

$$\text{InfoGain}(Y, x_i) = -\sum_{y \in Y} P(y)\log P(y) +$$
$$P(x_i)\sum_{y \in Y} P(y \mid x_i)\log P(y \mid x_i) + P(\overline{x}_i)\sum_{y \in Y} P(y \mid \overline{x}_i)\log P(y \mid \overline{x}_i),$$

and
where:
  $x_i$ is an i'th feature of the natural language text,
  S is a set constituting the at least one sensitive concept,
  s is a sensitive concept,
  U is a set constituting the at least one utility concept,
  u is a utility concept,
  Y is a dummy variable standing in for either S or U, and
  $\overline{Y} = Y \setminus y$ for some $y \in Y$.

14. The apparatus of claim 11, where, when identifying the features, the processor is to:
  determine, for a document forming a part of the natural language text, selected features of the document that numerically optimize a constrained objective function established to ensure that the selected features of the document implicate the at least one sensitive concept for the document more than the at least one utility concept for the document; and
  provide the selected features as the identified features.

15. The apparatus of claim 14,
where the constrained objective function is:

$$\min f(\hat{x}) = -\sum_i \text{Gain}(x_i, s, U_x)\hat{x}_i$$

such that:

$$0 \leq \hat{x}_i \leq \text{freq}(x_i),$$

$$\sum_i (\log(P(x_i \mid s)) - 1)\hat{x}_i \leq 0,$$

-continued $$\sum_i (-\log(P(x_i \mid u)) - 1)\hat{x}_i \le 0,$$

where:

$$\text{Gain}(x_i, s, U_x) = \log(P(x_i \mid s)) - \mu \cdot \log\left(\sum_{u \in U_x} P(x_i \mid u)\right),$$

and
where:
- $x_i$ is an i'th feature of the document,
- s is a sensitive concept of the document,
- $U_x$ is a set constituting at least one utility concept of the document,
- u is a utility concept of the document, and
- μ is a weighting parameter.

16. The apparatus of claim 11, where, when identifying the features, the processor is to:
determine, for a document forming a part of the natural language text, selected features of the document that numerically optimize a constrained objective function established to ensure that the selected features of the document implicate the at least one identified sensitive concept for the document more than at least k−1 other sensitive concepts, of the sensitive concepts, for the document; and
provide the selected features as the identified features.

17. The apparatus of claim 16,
where the constrained objective function is:

$$\min f(\hat{x}) = -\sum_i \text{Utility}(x_i, u)\hat{x}_i$$

such that:

$$0 \le \hat{x}_i \le \text{freq}(x_i),$$

$$\sum_i (\log(P(x_i \mid s))\hat{x}_i) \le \sum_i \log(P(x_i \mid \bar{s}_1))\hat{x}_i,$$

$$\vdots$$

$$\sum_i (\log(P(x_i \mid s))\hat{x}_i) \le \sum_i \log(P(x_i \mid \bar{s}_{k-1}))\hat{x}_i,$$

where:

$$\text{Utility}(x_i, u) = (1 - P(u))\log(P(x_i \mid u)) - \sum_{\bar{u} \in U \setminus u} P(\bar{u})P(x_i \mid \bar{u}),$$

and
where:
- $x_i$ is an i'th feature of the document,
- s is a sensitive concept of the document,
- U is a set constituting at least one utility concept of the document,
- u is a utility concept of the document, and
- $\bar{s} = \bar{s}_1, \ldots, \bar{s}_{k-1} \in S$ are a sequence of k−1 sensitive concepts obtained by ranking all $\bar{s} \in S \setminus s$ by $P(\bar{s})P(x \mid \bar{s})$.

18. The apparatus of claim 11, where, when perturbing the at least some of the identified features, the processor is to:
suppress the at least some of the identified features.

19. The apparatus of claim 11, where, when perturbing the at least some of the identified features, the processor is to:
generalize the at least some of the identified features.

20. The apparatus of claim 11, where the processor is further to:
provide the portion of the natural language text in which the at least some of the identified features have been perturbed as at least one redacted document.

21. A non-transitory computer-readable medium storing instructions, the instructions comprising:
one or more instructions that, when executed by at least one processor, cause the at least one processor to:
receive, via a user input device operatively connected to the at least one processor, one or more user inputs indicating sensitive concepts and utility concepts based on a user interface that includes a visual representation of a plurality of concepts in natural language text,
the plurality of concepts including the sensitive concepts and the utility concepts, and
the natural language text being in an electronic format;
determine the sensitive concepts based on the one or more user inputs, the sensitive concepts being concepts that are to be obscured;
determine the utility concepts based on the one or more user inputs, the utility concepts being concepts are desirable to be preserved;
determine, for at least one feature in the natural language text, a sensitive concepts implication factor based on class-conditional probabilities of the at least one feature according to the sensitive concepts;
determine, for the at least one feature in the natural language text, a utility concepts implication factor based on class-conditional probabilities of the at least one feature according to the utility concepts;
determine, for the at least one feature in the natural language text, a feature score based on a difference between the sensitive concepts implication factor and the utility concepts implication factor; and
perturb the at least one feature based on the feature score satisfying a threshold.

22. The non-transitory computer-readable medium of claim 21,
where the one or more user inputs includes a topic, and
where the sensitive concepts are associated with the topic.

23. The non-transitory computer-readable medium of claim 21, where the one or more instructions to perturb the at least one feature comprise:
one or more instructions that, when executed by the at least one processor, cause the at least one processor to: suppress the at least one feature.

* * * * *